United States Patent [19]
Buechler

[11] 3,788,741
[45] Jan. 29, 1974

[54] DISTANCE INDICATING OPTICAL PROBE
[75] Inventor: Lester W. Buechler, Dayton, Ohio
[73] Assignee: Systems Research Laboratories, Inc., Dayton, Ohio
[22] Filed: July 26, 1972
[21] Appl. No.: 275,432

[52] U.S. Cl.................................... 356/4, 356/120
[51] Int. Cl............................................. G01c 3/08
[58] Field of Search ............ 356/4, 5, 120; 250/227

[56] References Cited
UNITED STATES PATENTS
3,719,421    4/1973    Poilleux et al.......................... 356/5

Primary Examiner—Malcolm F. Hubler
Assistant Examiner—S. C. Buczinski
Attorney, Agent, or Firm—Biebel, French & Bugg

[57] ABSTRACT

An optical probe for monitoring the distance to an object includes at least a pair of fiber optic bundles, each bundle having the image of its end surface focused at a plane preferably located on either side of the normal position of an object. Each optic object bundle includes one or more fibers used as a receiver and one or more additional fibers used as light transmitters. When the image of the end of the fiber optic bundle is in focus on the object, the light observed by the receiving fiber is at a minimum. As the focus is changed, light from the transmitting fibers will increasingly cover the area observed by the receiving fibers, the intensity of the received light being a function of the out-of-focus distance. By using a pair of optical fiber bundles, the surface of which are focused at different planes, an unambiguous output may be obtained which can be converted directly into a distance measurement from the probe to an object under observation. Reflectivity of the surface of the object may be compensated for by comparing the light received by the receiving optical fibers. In one alternative embodiment, an image is formed by a single transmitter-receiver combination and the focal distance is modified by means of a high index of refraction material which is periodically interposed in the light path. In other embodiments, a beam splitter is used with two transmitter-receiver combinations and the light sources are separated by a means such as, by alternately switching the lights and detectors on and off, by light filters, or by use of polarized light.

20 Claims, 13 Drawing Figures

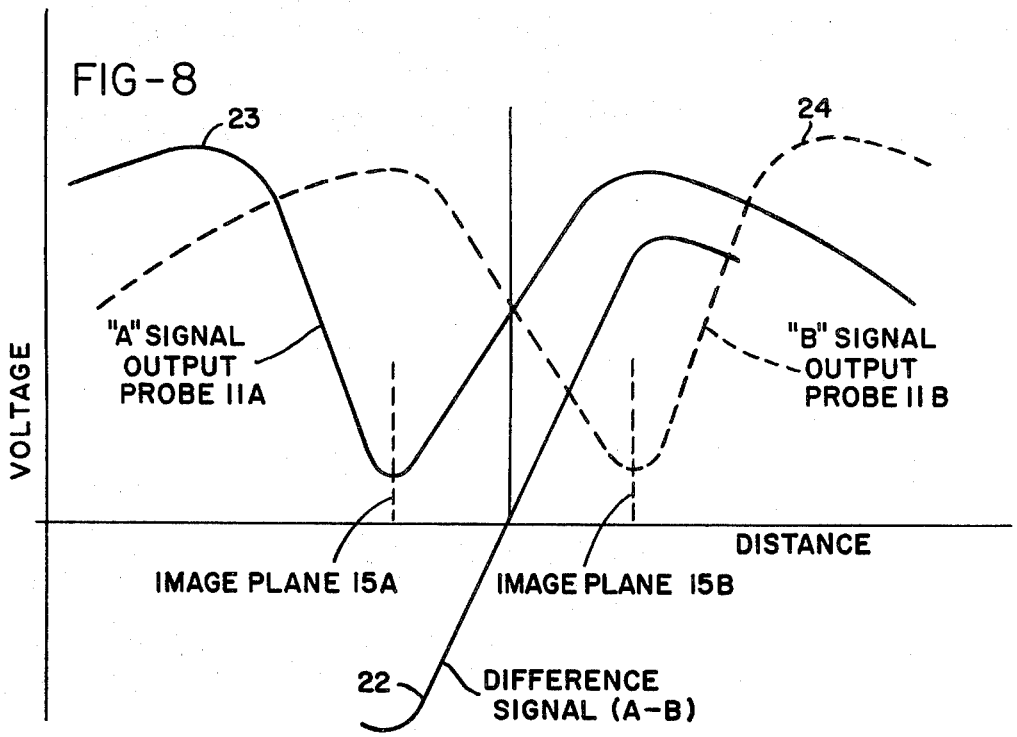
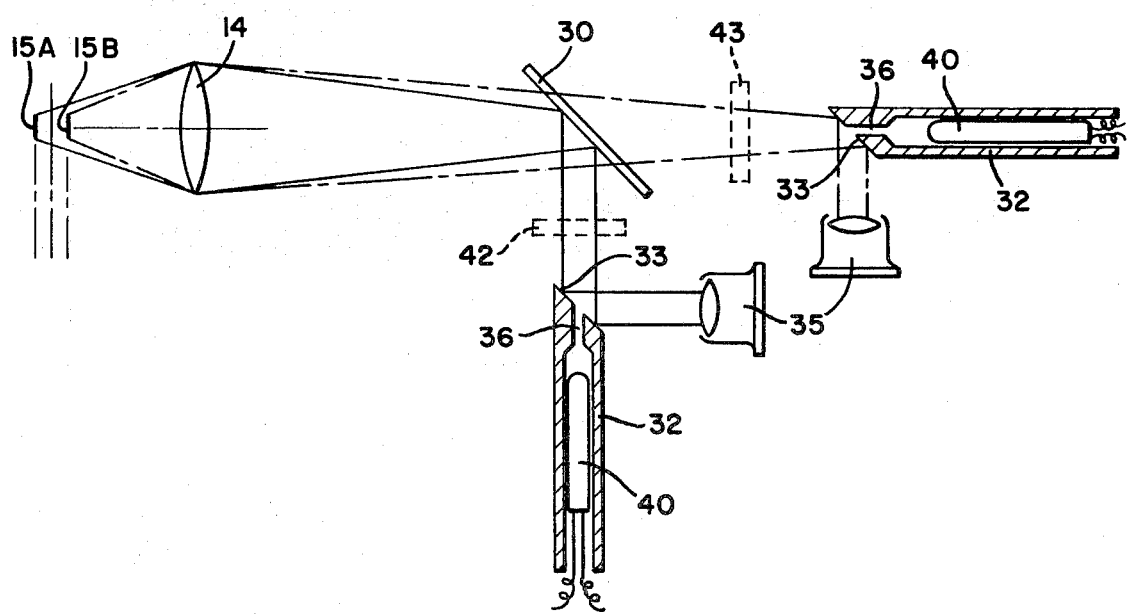

DISTANCE INDICATING OPTICAL PROBE

BACKGROUND OF THE INVENTION

The use of fiber optic probes for measuring distance is a recognized technique. Commonly, a probe with some transmitting fibers and some receiving fibers is used. By measuring the light received by the receiving fibers an output signal as shown in FIG. 1 (prior art) is obtained. Examples of fiber optic probes are shown in the U.S. Pat. to Kissinger, No. 3,327,584.

The use of a fiber optic probe which produces a curve of this type provides a reasonable measurement of distance. However it has two major faults: The reading is partially a function of the reflectivity of the surface; and the probe must work close to the surface, i.e., in the order of 0.002 to 0.020 inch from the surface. This makes it difficult to use in production setups. Compensation for reflectivity can be done but it is also difficult and only approximate, especially if the surface being measured is changing or moving.

Lens systems have been used to image a light source onto a surface or object, together with apparatus for displacing the focus plane, while optically observing the image, as shown in the U.S. Pat. to Gunther et. al., No. 3,137,756. Such systems measure displacement of the object from a plane of focus and are inherently subject to errors due to variations in the reflectivity of the object. Another ranging system which measures displacement from a focus plane is shown in the U.S. Pat. to Bliss et. al., No. 3,385,159.

SUMMARY OF THE INVENTION

The present invention is directed to an improved optical ranging or measuring apparatus and method, and is based upon the employment of two planes of focus. The apparatus and method include the projection of at least a pair of focused light patterns at an object, the standoff distance of which is to be measured with high accuracy. The projection apparatus defines a pair of light patterns with a predetermined geometric shape, and this shape is characterized by the formation of at least one relatively dark area adjacent a light or illuminated area. The patterns are focused by projection means at a pair of discrete axially spaced planes.

A detector, or a pair of detectors, is employed and is responsive to the quantity of light falling in the dark areas of the patterns and provides electric signals which vary in accordance with the variations in distance of the object from each of the planes. In other words, a pair of electric signals are produced each of which has a pronounced dip at its respective plane of focus, since at the focus plane the least amount of light will be distributed to the dark areas of the patterns, while at all other positions the respective pattern will be somewhat out of focus.

The apparatus and method further includes the comparison of the signals from the detector or detectors to provide an indication of the axial spacing of the object from the median distance between the planes of focus and to compensate for variations in reflectivity.

Several embodiments are disclosed for producing various patterns and for causing the image to be defined in two axially spaced planes. In the preferred forms, a projection lens is employed so that the image from a light emitter or source may be accurately projected and focused, combined with detectors which also operate through the focusing lens. For example, the image or pattern may be formed by a fiber optic bundle which may comprise both the transmitting and the receiving fibers to form the desired geometric light pattern and complementary dark pattern. Alternately, separate transmitting and receiving sources may be used.

In another form of the invention, a single transmitter receiver system is employed and the focal length is varied by the inserting in the optical path a refracting material, or by physically moving the probe back and forth, to form the two planes of focus. In other embodiments, separate pairs of transmitters and receivers are employed, together with suitable optical or electric switching means. The transmitter-receiver combinations may be set up on closely parallel paths or may operate along a common path such as through a half-silvered mirror or through optical filters.

One of the important advantages of the invention resides in the fact that while the shape of the output curve for each detector varies with surface reflectance, the bottom of the dip is not axially displaced. In the preferred form, a net error signal is obtained as the object surface varies between the two image planes and this error signal is the difference between the two outputs of the detectors. The actual error voltage will be a function of reflectivity (actual reading), and compensation may be provided by dividing the error signal by the sum of the signals. The reflectivity of the surface can be obtained either from the sum signals directly or by a separate detector which measures the total reflected light from the surface being viewed.

The invention accordingly has several important objects and advantages, including the ease of compensation for reflectivity since reflectivity is a function of the sum of the detector outputs.

Another advantage of the invention resides in the fact that by the use of lenses, the probe may be spaced a reasonable distance from the surface of the object. The improvement in standoff distance over the use of fiber optic bundles only is substantial and increases the usefulness of the apparatus. In the preferred form, projection lenses are employed, and the imaging sources are fixed in relation to the lens. There is no problem in knowing the exact shift of the optical image as this may be preset or may be effected by rotating high index material in and out of the optical path.

These and other objects and advantages of the invention will be apparent from the following description, the accompanying drawings and the appended claims.

BRIEF DESCRIPTION OF THE DRAWINGS

FIG. 8 is a further diagram showing the manner in which the output signals of the detectors are combined;

FIG. 9 illustrates an alternate embodiment of the invention;

DESCRIPTION OF THE PREFERRED EMBODIMENTS

Theory of Operation

Figure 1:
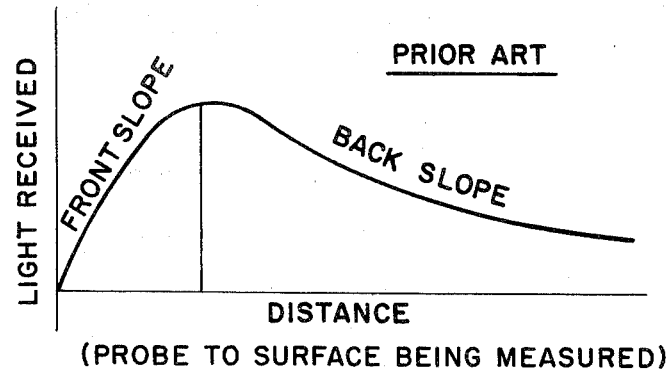
FIG. 1 is a diagram of the output signal from a typical prior art probe.

FIG. 1 represents a diagram of the variation in probe output versus probe distance from the object when a single bundle of fiber optic transmitting and receiving fibers are used in close proximity to an object. The output is at a maximum at only one spacing and falls off with different slopes on either side of maximum. Compensation for variations due to changes in the absolute reflectivity of the object is difficult and at best is an approximation.

Figure 2:
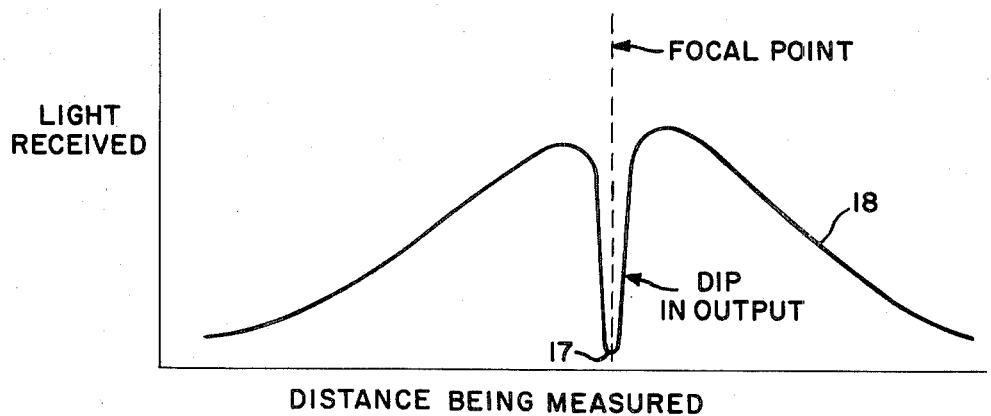
FIG. 2 illustrates the output signal from one of the detectors of the present invention.
Figure 4:
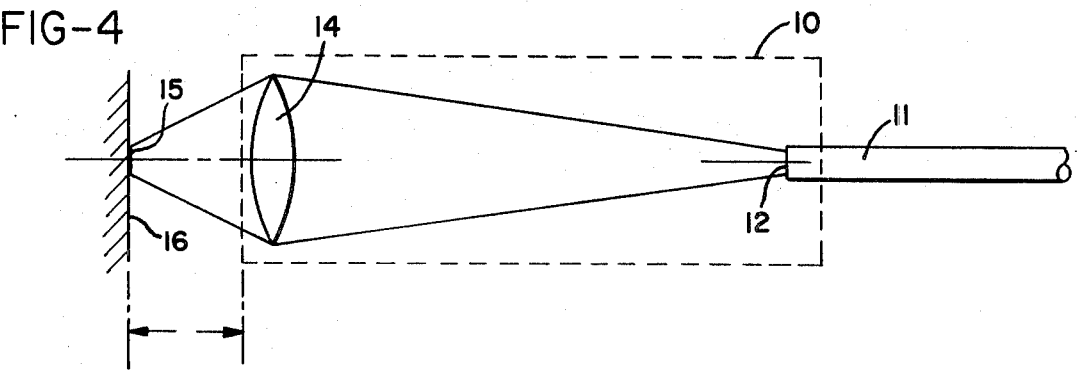
FIG. 4 is a diagram of one of the transmitter-receiver combinations.

FIG. 2 illustrates the corresponding output from a probe 10 as diagrammatically shown in FIG. 4. The probe 10 employs a fiber optic bundle 11 which is comprised of part transmitting and part receiving fibers terminating at a front plane 12 and defining a pattern of predetermined light and dark areas. A lens 14 is focused on the plane 12 and forms an image of the array bundle at an image plane 15 shown here as being coincident with the surface of an object 16. The array of fibers preferably defines a geometric arrangement of illuminated areas and a complementary arrangement of dark receiver areas. When the lens 14 is in focus (or the object 16 is in the focus plane 15) the transmitting fibers transmit back to themselves and not to the receiving fibers, thus producing the pronounced dip or V 17 in the output curve 18 of the receiving optical fibers, as shown in FIG. 2.

Figure 3:
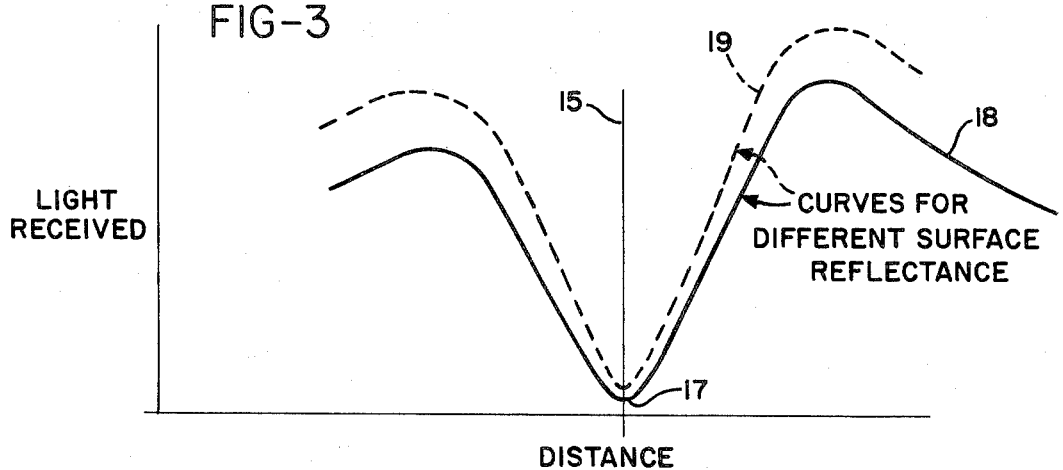
FIG. 3 is an enlarged portion of FIG. 2 showing variations due to different surface reflectivities.

FIG. 3 is an enlarged portion of the region of the dip 17 of the diagram of FIG. 2. The dip 17 is shown in FIG. 3 as being reasonably symmetrical about the focal plane 15 and the sides of the dip are relatively steep and are similar to the front slope of the curve of FIG. 1. The two sides are not identical but approach mirror images low in the dip. The dip does not go completely to zero due to reflectance, surface dispersion, stray light and lens imperfections. Changes in reflectance changes both sides of the curve very close to the same degree, as shown by the dashed line, curve 19. The bottom of the curve can be accurately determined in any given setup.

Since the bottom or dip 17 of the V-shaped curve is known, the unknown distance to an object surface can be measured by causing the V of the curve effectively to be moved axially back and forth along the optical path into two axially spaced planes or positions. In effect, a pair of focused light patterns are directed to the object, such as the image planes 15A and 15B of FIGS. 5 and 6 which represent patterns which are focused respectively at a pair of axially spaced planes. This is accomplished in the embodiment of FIG. 5 by using a pair of bundles 11A and 11B positioned closely adjacent to each other and terminating at respective planes 12A and 12B, which are axially displaced. A common lens 14 projects the images of the bundles 11A and 11B to image planes 15A and 15B. The total displacement ($a+b$) will be in the order of 1/5th to 1/20th the displacement of the planes 12A and 12B according to the magnification of the lens 14.

Figure 6:
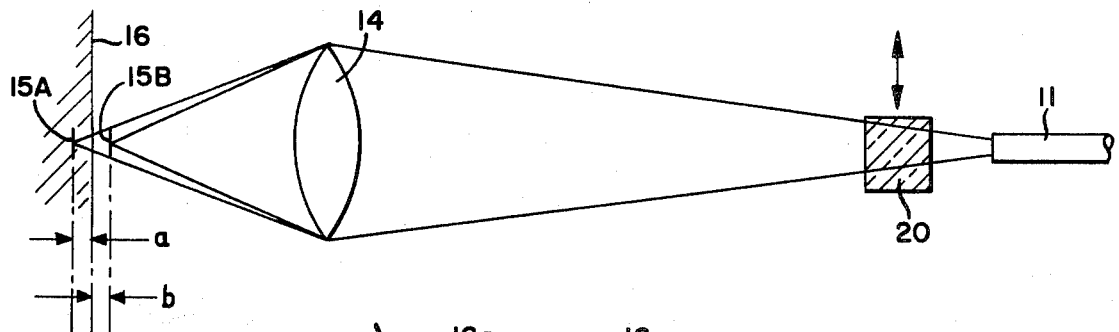
FIG. 6 shows the employment of image shifting by using a block of high index of refraction material.

In the probe of FIG. 6, the image planes 15A and 15B are caused to move to either side of the median position between the planes, shown here as the object surface 16, by moving a block 20 of the material having a high index of refraction, such as glass, in and out of the optical path of the bundle 11.

As the focal point is displaced to positions 15A and 15B, such as by using two probes (FIG. 5), moving the probe 11 physically, electrically switching between two or more probes (FIG. 9), or changing the effective length of the optical path (FIG. 6), several techniques may be used to measure the relationship of the probes to the surface 16. These include: (a) determining the bottom 17 of the V curve 18 by minimum reading on differential of output signal, (b) determining the midpoint of the curve 18 by summing and halving the readings at one or more points of equal output along the two sides of the curve, or (c) measuring the deviation in output with distance along the sides of the curve. The last technique is considered most practical, providing full compensation is made for reflectivity. Also in a commercial unit it is desirable to use only two points rather than a continuous curve. A continuous curve requires an analog sweep of the focal point by some such method as a rotating glass wedge, (or counter rotating wedges to avoid the image moving).

Figure 5:
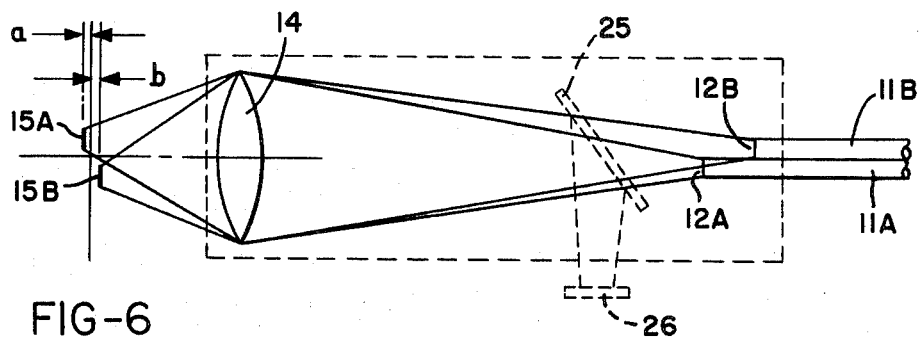
FIG. 5 shows the employment of a pair of fiber optic transmitter-receiver bundles with a common lens system.
Figure 7:
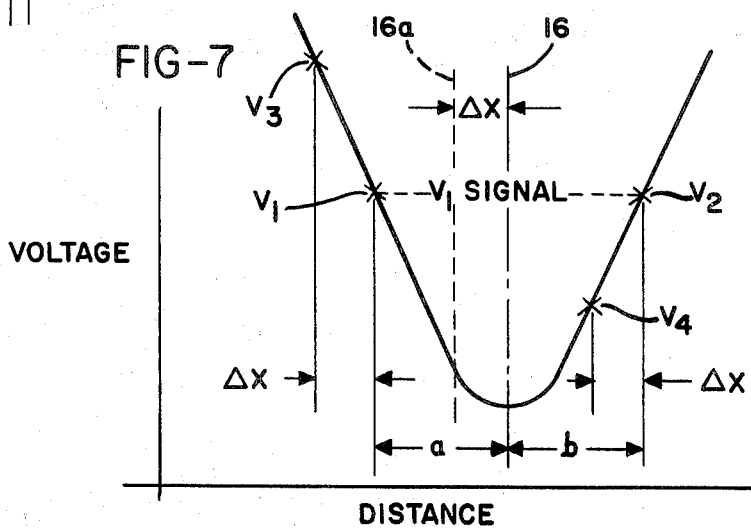
FIG. 7 is a diagram of a portion of the output signal of the detectors with respect to distance.

In the examples of FIGS. 5 or 6, the probe is set up such that the surface 16 is out of focus by an amount $a$. This gives an output voltage $V_1$ as shown in FIG. 7. The unit is adjusted such that with transmitter 11B (FIG. 5), or with the high index material 20 of FIG. 6 in the light path, the image plane is made to shift to a point $b$ on the other side, resulting in an output $V_2$. If $a$ is the same as $b$ the outputs $V_1$ and $V_2$ will be the same for both points. This is considered the normal surface position and is at the median plane between 15A and 15B. If the surface 16 shifts in the direction of $a$ by an amount $\Delta X$ to 16a, the output signal will shift up on the $a$ curve side to $V_3$ and down on the $b$ curve side to $V_4$. The amount of shift $\Delta X$ from the normal position may be determined by measuring $V_3-V_4$.

FIG. 8 illustrates a voltage curve 22 representing the difference between the two outputs 23 and 24 of the 11A and 11B probes with surface movement as its distance from the probe varies. Since the voltage of curve 22 is a function of the reflectivity or actual readings, it is proposed to also use a signal such as the sum signals (A+B) and divide this into the voltage (A−B) of curve 22 to provide a signal representing distance from the probe to the object independent of the reflectivity of the surface of the object or the intensity of the transmitted light.

In FIG. 5 an alternate method of measuring surface reflectivity is also shown including a half-silvered mirror 25, interposed in the optical path and a separate photodetector 26 is used to measure the total light (A+B) reflected from the surface 16.

In FIG. 9 is illustrated one form of the invention in which light from a pair of infrared sources are optically projected by the lens 14 into the respective image planes 15A, 15B as distinguished from the use of fiber optic bundles as transmitters and receivers. In this embodiment, and interposed half-silvered mirror 30 is used as a beam splitting device so that each of the transmitter-receiver pairs operate along identical optical paths. The probe may be fiber optic probes or a pair of detector holders 32 formed with beveled mirror surfaces 33. Approximately collimated light is projected by light sources 35, which may comprise General Electric infrared lamps SSL–35 incorporating internal collimating lenses. An aperture 36 is formed within the holder 32 and opens at the mirror surface 33 to provide means for admitting light to a photodiode detector 40 or receiver.

The mirror surfaces 33 and the apertures 36 provide means forming a geometric light pattern characterized by an angular illuminated area and included central dark area. The lengths of the optical paths to each of the mirror surfaces of the holders 32 are different to effect the desired displacement of the image planes 15A and 15B. Preferably each combination of source 35 and detector 40 is switched in turn, such as by half wave switching. Alternatively, switching may be eliminated and different colored light filters 42 and 43 and detectors may be employed which work at the different wave lengths of the radiation frequency band transmitted through the filter. For example, one of the transmitter-receiver combinations may operate with blue or green light, while the other operates in the red or infrared range. It is also within the scope of this invention to employ polarized light sources and/or polarized filter elements as a means of separating the light beams, in lieu of a switching arrangement.

FIGS. 10–13 illustrate a preferred embodiment of the invention wherein a distance indicating optical probe 50 is mounted on a stand 52 adjacent a turn table 55 upon which is mounted a plurality of objects 57, the position of which with reference to the turn table is to be determined. Due to the fast response time of the optical probe of this invention, surface inspections at a rate of up to 1,000 inches per second and part rates at from 10 to 50 parts per second are possible with the end of the probe standing off from the surface of the objects being measured by approximately one half inch. By using the techniques described herein, accuracies of 0.0001 inch may be obtained.

The distance indicating optical probe 50 performs in a fixed position and provides an output voltage which is a function of the distance between the end of the probe and the object. The distance may be displayed digitally on a display device 60. The indicating device 60 includes a digital display 61 and an offset adjustment 62 so that deviations from a predetermined distance can be observed. Of course, it is within the scope of this invention to provide for automatic alarm in the event that a part is misplaced or to use the output of the device to move a servo driven platform, such as a machine tool bed, where it is desirable to position a part. The output of the device may also be used for counting or for external recording purposes.

Thus, the digital indicating optical probe of this invention may be used for part measurements for dimensions, flatness, diameters and out-of-roundness, contour and surface measurements, for roughness, flaws, dents or cracks. The invention may also be used for indicating the motion of parts in rotation or vibration.

Figure 11:
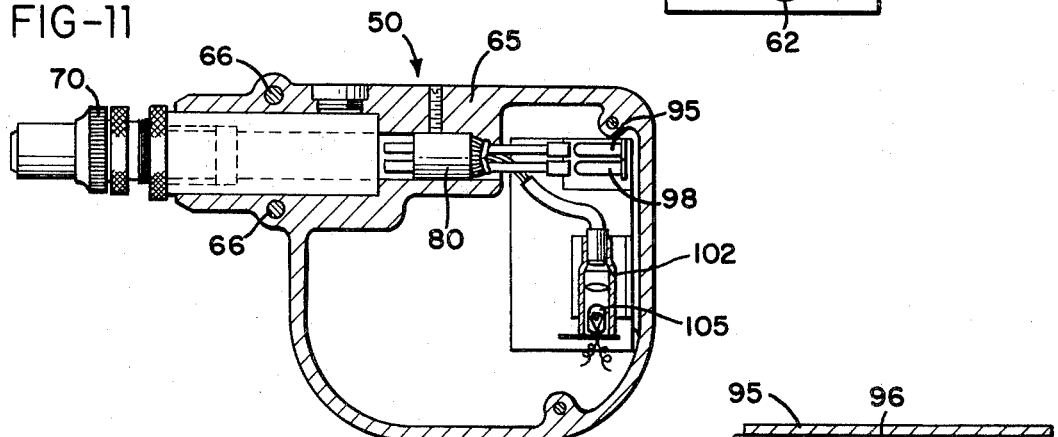
FIG. 11 is a view of the transmitter-detector of FIG. 10 with the cover removed.

The distance indicating optical probe 50 shown in FIG. 11 includes a housing 65 including a pair of openings 66 through which bolts 67 may be inserted to mount the housing to the support stand 52. A lens assembly 70 is adjustably mounted in the housing 65 to focus the images from a fiber optic array onto a pair of image planes, preferably equally spaced on either side of the surface of the object under investigation. The lens assembly 70 is of conventional construction. A probe assembly 80 is mounted in optical alignment with the lens assembly 70 and includes four fiber optic bundles arranged with the end surface of one pair of bundles in one plane, and the end surface of the other pair of bundles in another plane.

Figure 12:
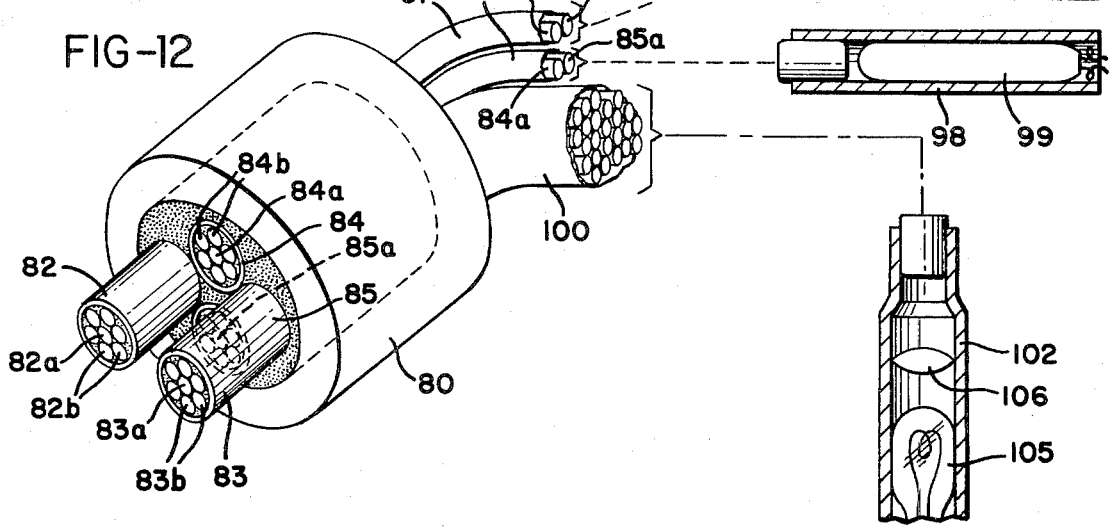
FIG. 12 is a detailed perspective view of a fiber optic bundle used in the transmitter-detector device of FIG. 10.

FIG. 12 shows in detail the fiber optic probe assembly 80. Each of the four fiber optic bundles 82, 83, 84 and 85 are supported in a casing 86 by means of an epoxy compound 87. The end surfaces of fiber optic bundles 82 and 83 are in one plane, corresponding to plane 12A in FIG. 5, while the end surface of fiber optic bundles 84 and 85 are in another plane, corresponding to plane 12B in FIG. 5.

Each of the fiber optic bundles 82–85 includes seven individual optical fibers of approximately the same diameter. For example, fiber optic bundle 82 includes a center fiber 82a and six peripheral fibers 82b surrounding the central fiber. The center fiber 82a is used as the receiver or detector while the six peripheral fibers 82b are used to project light onto the focused image plane. As described above, it is only when the image of the optical fibers is precisely focused onto the object that the minimum amount of light will be received by the central fiber 82a. Similarly, the fiber optic bundles 83–85 each include a central receiving optical fiber 83a–85a and six peripheral and adjacent transmitting fibers 83b–85b.

The receiving fibers 82a and 83a have their ends in the same plane and are combined in a cable 91 which terminates in a detector assembly 95 including a photo transistor 96. Optical fibers 84a and 85a are combined in a single cable 97 and are terminated in a detector assembly 98 including a photo transistor 99. Thus, the light projected onto the photo transistors 96 is the combined light from the optical fibers 82a, 83a while the light directed to photo transistor 99 is from fibers 84a and 85a.

The remaining optical fibers, 82b–85b are combined in a single larger cable assembly 100 and are terminated in a light source assembly 102 including a light source 105 and a lens 106 or other optical device to distribute evenly the light onto the ends of the fibers.

Each optical fiber in the embodiment shown in FIG. 12 is approximately 0.030 to 0.040 inch in diameter. It has been found that the slope of the response curve, such as curves 23 and 24 in FIG. 8, is determined by the contact area of the receiving fibers with the adjacent transmitting fibers. With a greater number of transmitting fibers surrounding and in contact with the receiving fiber, the slope of these curves in the area of the null is increased or made steeper.

Figure 10:
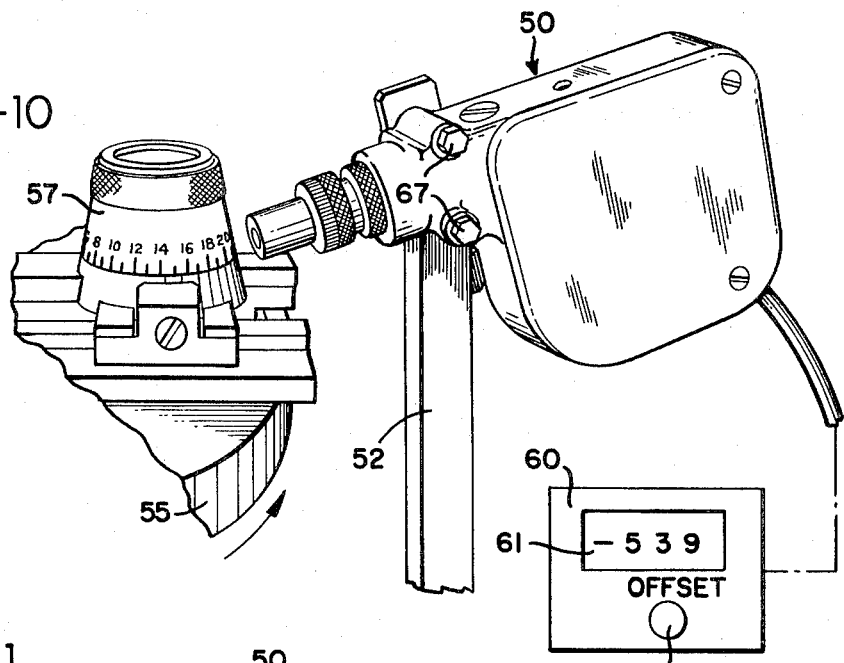
FIG. 10 shows a complete system, including visual readout, for measuring the standoff distance of an object.
Figure 13:
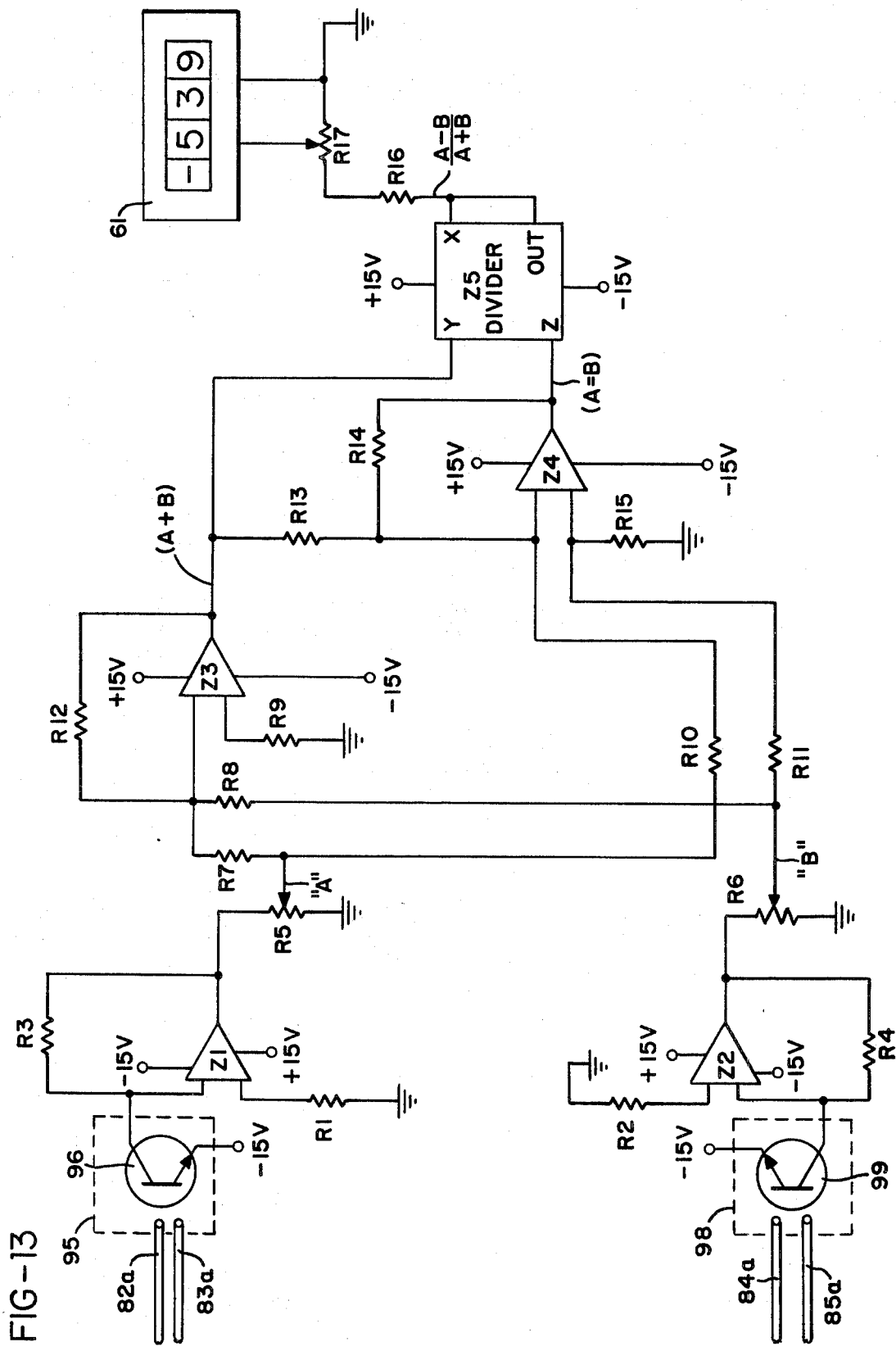
FIG. 13 is an electrical schematic diagram of the embodiment of FIG. 11.

FIG. 13 is an electrical schematic diagram of a circuit which is used with the invention shown in FIGS. 10–12.

The ends of optical fibers 82a and 83a are positioned adjacent photo transistor 96 the output of which is connected to a signal amplifier Z1. Optical fibers 84a and 85a are positioned adjacent the photo transistor 99, and the light energy received by these fibers is amplified by signal amplifier Z2. Photo transistors 96 and 99 are type GS 423 photo transistors manufactured by General Sensors. Potentiometers R5 and R6 are connected in the output circuits of amplifiers Z1 and Z2, respectively, and the center tap connections of these potentiometers represent the A and B outputs referred to above. These potentiometers may be adjusted to make minor corrections for the characteristics of the individual photo transistors 96 and 99 and their corresponding amplifiers.

The A and B outputs are summed in amplifier Z3 while the output of amplifier Z4 represents the difference between these signals (A—B). The outputs of amplifiers Z3 and Z4 are connected to a divider Z5, the output of which represents (A—B)/(A+B).

The table below gives the type number or values of the components shown in FIG. 13.

| | |
|---|---|
| R1, R2, R3, R4 | 499 K ohm, 1% |
| R5, R6 | 10 K ohm, potentiometer |
| R7, R8, R10, R11 | 10 K ohm, 1% |
| R9, R12 | 45.3 K ohm, 1% |
| R13 | 402 K ohm, 1% |
| R14, R15, R16 | 45.3 K. ohm, 1% |
| R17 | 10 K ohm |
| Z1, Z2 Harris Semiconductor, μA 27055 Operational amplifier | |
| Z3, Z4 Texas Instrument, μA 741 Operational amplifier | |
| Z5 Hybrid Devices, type 107, Multiplier/divider | |

The output of the divider Z5 is connected to a digital volt meter 61 of conventional construction. This voltmeter may be calibrated by resistors R16 and R17 to read directly in inches of displacement of the object from a plane intermediate of the planes 15A and 15B. The voltmeter also contains a binary coded decimal signal which may be used for other purposes, such as control for positioning the object under measurement or digital storage of information.

While the method herein described, and the forms of apparatus for carrying this method into effect, constitute preferred embodiments of the invention, it is to be understood that the invention is not limited to this precise method and forms of apparatus, and that changes may be made in either without departing from the scope of the invention which is defined in the appended claims.

What is claimed is:

1. Distance measuring apparatus comprising projection means directing at least a pair of focused light patterns at an object, each said light pattern having a predetermined geometric shape and being focused by said projection means at a pair of axially spaced planes, each said pattern being characterized by at least one relatively dark area which area is most precisely defined only at the associated plane of focus thereof, detector means responsive to light falling in said dark areas on said object and providing a pair of electric signals which varies with variations in distance of said object from each of said planes, and signal comparing means providing an indication of the axial spacing of said object from the median distance between said planes.

2. The apparatus of claim 1 wherein said projecting and detector means comprise a pair of separate projectors and a corresponding pair of separate detectors forming a pair of projector-detector combinations.

3. The apparatus of claim 1 in which said projection means comprises a single projector and said detector means comprises a single detector aligned essentially on an optical path in common with said projector, and image shifting means movable selectively in said path defining said axially spaced image planes.

4. The apparatus of claim 1 further comprising a projection lens, said projection and detector means comprise a pair of separate projectors and a corresponding pair of separate detectors forming a pair of projector-detector combinations located on a common optical path to said lens, beam splitting means interposed between said lens and said projector-detector pair, and means alternately activating said projector-detector combinations.

5. The apparatus of claim 1 further comprising a projection lens, said projection and detector means comprise a pair of separate projectors and a corresponding pair of separate detectors forming a pair of projector-detector combinations located on a common optical path to said lens, beam splitting means interposed between said lens and said projector-detector pair, and filter means in separate light paths activating said projector-detector combinations.

6. The apparatus of claim 2 further comprising a projection lens, and each of said projector-detector combinations being incorporated in separate fiber-optic bundles having terminal ends, said lens arranged to project the images of said bundle terminal ends defining said light patterns in said axially spaced planes.

7. The apparatus of claim 5 in which bundle terminal ends are positioned in closely adjacent but axially spaced relation.

8. The apparatus of claim 5 wherein each of said fiber optic bundles includes a central optical fiber functioning as a detector and a plurality of optical fibers functioning as light transmitters positioned adjacent to and surrounding said detector.

9. The apparatus of claim 1 wherein said light patterns are formed by at least a pair of fiber optic bundles terminating in a pair of axially spaced planes, each of said bundles including a centrally positioned fiber defining a receiving element and a plurality of peripherally arranged fibers surrounding said central fiber defining light transmitting fibers, and wherein the intensity of the light image of said transmitting fibers falling within the image of said light receiving fiber is a function of the distance of the object from the plane of focus.

10. High resolution optical distance measuring apparatus for measuring the displacement of an object from a given position along an optical axis, comprising
first detector means including first light image forming means defining a light image of predetermined shape at a first plane displaced on one axial side of said position and optical sensor means focused on said first plane in the region of said image and being responsive to an out-of-focus condition thereof on either side of said first plane;
second detector means including second light image forming means defining a second light image of predetermined shape at a second plane axially spaced from and at the axially opposite side of said position, and second optical sensor means focused on said second plane in the region of said second light image and responsive to an out-of focus condition thereof on either side of said second plane;

each of said detector means further including transducer means providing electric signals proportional to the degree of deviation or displacement of an image formed on said object from said given position;

control means providing a pair of electrical output signals representative of the deviation of said object from each of said planes; and comparison means responsive to the difference between said output signals providing an indication of the actual displacement of said object from said given position.

11. The apparatus of claim 10 including lens means defining each of said images into a given pattern of light and dark areas, and said sensor means being responsive through said lens means principally to the dark areas of said patterns.

12. The apparatus of claim 11 in which said pattern defining means comprises an annular reflector, and said detector is responsive to light received through the reflector annulus.

13. The apparatus of claim 11 in which said pattern defining means comprises an array of transmitter and receiver optical fibers, and said detector means is connected to receive through said receiving fibers.

14. The apparatus of claim 10 further including circuit means responsive to the sum of said output signals to provide a measurement of the reflectivity of the surface of said object, and further circuit means for dividing a signal representing the difference between said output signals by the sum of said output signals to provide an output representing the distance which is substantially independent of reflectivity or the intensity of the light images.

15. The apparatus of claim 10 further including separate detector means for sensing the light reflected from the surface of said object, and circuit means for dividing a signal representing the difference between said output signals by the output of said separate detector means to provide a distance measurement which is substantially independent of either reflectivity of the object or the intensity of said light images.

16. The method of measuring the distance along an axis of an object from a desired position comprising the steps of:

focusing a light image of a predetermined shape on a plane axially spaced to one side of said position, measuring the light reflected from an object on said axis in a pattern complementary to said light image pattern as an indication of displacement of said object from said plane;

forming a second light image of predetermined shape on a second plane axially spaced to the other side of said position;

measuring the light reflecting from said object in a pattern complementary to said second light pattern as an indication of the displacement of said object from said second plane; and comparing the intensity of said reflector light patterns as an indication of the total displacement of said object from said desired position.

17. The method of claim 16 in which said light images are focused at equal distances on either side of said predetermined position.

18. The method of claim 16 in which each of said light image patterns are identical.

19. The method of claim 16 in which said comparing step includes forming electric signals corresponding to the intensities of said reflected light from said patterns and taking the difference of said signal as representative of said total displacement.

20. The method of claim 19 including the further step of dividing said difference signal by the sum of said signals to eliminate error due to variations in reflectivity of said object.

* * * * *